US009892371B1

(12) United States Patent
Cronin (10) Patent No.: US 9,892,371 B1
(45) Date of Patent: Feb. 13, 2018

(54) QUEUE INFORMATION TRANSMISSION (71) Applicant: ProSports Technologies, LLC, Miami, FL (US)

(72) Inventor: John Cronin, Bonita Springs, FL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

(21) Appl. No.: 14/798,291

(22) Filed: Jul. 13, 2015

Related U.S. Application Data (60) Provisional application No. 62/029,654, filed on Jul. 28, 2014.

(51) Int. Cl.
*G06Q 10/00* (2012.01)
*G06Q 10/02* (2012.01)
(Continued)

(52) U.S. Cl.
CPC ......... *G06Q 10/02* (2013.01); *G06K 9/00778* (2013.01); *G06Q 30/0201* (2013.01); *G06Q 30/0261* (2013.01)

(58) Field of Classification Search
CPC .. G06Q 10/02; G06Q 10/0201; G06Q 10/109; G06Q 30/0201; G06Q 30/0261; H04W 4/04; G06K 9/00778
(Continued)

(56) References Cited

U.S. PATENT DOCUMENTS 6,329,919 B1 12/2001 Boies et al.
6,778,085 B2 8/2004 Faulkner et al.
(Continued)

FOREIGN PATENT DOCUMENTS

CN 102843186 12/2012
KR 20080050251 A * 6/2008
(Continued)

OTHER PUBLICATIONS

Liou Chu, Lin Hui, and Fu-Yi Hung, Simulation of Theme Park Queuing System by Using Arena, Oct. 16-18, 2013; Proceeding IIH-MSP '13 Proceedings of the 2013 Ninth International Conference on Intelligent Information Hiding and Multimedia Signal Processing, pp. 17-20.*
(Continued)

*Primary Examiner* — Kevin Flynn
*Assistant Examiner* — Freda A Nelson
(74) *Attorney, Agent, or Firm* — Polsinelli LLP (57) ABSTRACT

Information may be determined about one or more queues located within an event venue, the information including how many people are in the queue and an average rate at which the queue is moving forward. The queues may each be associated with commercial enterprises such as concession stands. If a particular queue suffers from a low queue population or a low queue movement rate, a queue broadcast may be transmitted using one or more local wireless transmitters which each have a wireless transmission zone that is at least partially within the event venue. The queue broadcast may include queue information and may include an advertisement or perk, such as a discount or special offer for the commercial enterprise associated with the queue, thus incentivizing eventgoers to go to less-crowded or less-popular queues.

19 Claims, 7 Drawing Sheets (51) Int. Cl.
*G06Q 30/02* (2012.01)
*G06K 9/00* (2006.01)

(58) Field of Classification Search
USPC ......... 705/14.3, 7.29, 5–6, 14.58; 455/404.1, 455/456.3, 526; 382/103; 340/12.5
See application file for complete search history.

(56) References Cited

U.S. PATENT DOCUMENTS

| | | | |
|---|---|---|---|
| 7,671,730 B2 | 3/2010 | Henderson | |
| 7,715,723 B2 | 5/2010 | Kagawa et al. | |
| 7,724,131 B2 | 5/2010 | Chen | |
| 7,778,855 B2* | 8/2010 | Holliday | G06Q 10/06315 705/7.29 |
| 7,929,867 B2 | 4/2011 | Nakagawa | |
| 7,970,537 B2 | 6/2011 | Ann et al. | |
| 8,126,782 B1 | 2/2012 | Zhu et al. | |
| 8,188,878 B2 | 5/2012 | Pederson et al. | |
| 8,275,096 B2 | 9/2012 | Neece | |
| 8,589,667 B2 | 11/2013 | Mujtaba et al. | |
| 8,611,930 B2 | 12/2013 | Louboutin et al. | |
| 8,620,344 B2 | 12/2013 | Huang et al. | |
| 8,626,465 B2 | 1/2014 | Moore et al. | |
| 8,630,216 B2 | 1/2014 | Deivasigamani et al. | |
| 8,660,501 B2 | 2/2014 | Sanguinetti | |
| 8,706,044 B2 | 4/2014 | Chang et al. | |
| 8,724,723 B2 | 5/2014 | Panicker et al. | |
| 8,750,207 B2 | 6/2014 | Jeong et al. | |
| 8,789,175 B2 | 7/2014 | Hubner et al. | |
| 8,793,094 B2 | 7/2014 | Tam et al. | |
| 8,816,868 B2 | 8/2014 | Tan et al. | |
| 8,831,529 B2 | 9/2014 | Toh et al. | |
| 8,831,655 B2 | 9/2014 | Burchill et al. | |
| 8,836,851 B2 | 9/2014 | Brunner | |
| 8,843,158 B2 | 9/2014 | Nagaraj | |
| 8,849,308 B2 | 9/2014 | Marti et al. | |
| 8,862,060 B2 | 10/2014 | Mayor | |
| 8,863,172 B2 | 10/2014 | Hardin et al. | |
| 8,873,418 B2 | 10/2014 | Robinson et al. | |
| 8,874,090 B2 | 10/2014 | Abuan et al. | |
| 8,917,632 B2 | 12/2014 | Zhou et al. | |
| 8,934,921 B2 | 1/2015 | Marti et al. | |
| 9,054,800 B2 | 6/2015 | Suresh et al. | |
| 9,449,121 B2* | 9/2016 | Marti | G06F 17/5009 |
| 9,607,497 B1 | 3/2017 | Cronin | |
| 2002/0167408 A1 | 11/2002 | Trajkovic et al. | |
| 2003/0014749 A1* | 1/2003 | Simons | G06Q 30/06 725/23 |
| 2003/0036936 A1* | 2/2003 | Steichen | G06Q 10/0639 705/7.38 |
| 2003/0102956 A1 | 6/2003 | McManus et al. | |
| 2006/0273920 A1 | 12/2006 | Doan et al. | |
| 2009/0112638 A1 | 4/2009 | Kneller et al. | |
| 2009/0249342 A1 | 10/2009 | Johnson | |
| 2009/0319306 A1 | 12/2009 | Chanick | |
| 2010/0141480 A1 | 6/2010 | Brooks et al. | |
| 2011/0029894 A1 | 2/2011 | Eckstein | |
| 2011/0179041 A1 | 7/2011 | Souto et al. | |
| 2012/0078667 A1 | 3/2012 | Denker et al. | |
| 2012/0116863 A1 | 5/2012 | Boss et al. | |
| 2012/0154169 A1 | 6/2012 | Hoekstra | |
| 2012/0207350 A1* | 8/2012 | Loos | G06K 9/00778 382/103 |
| 2012/0315868 A1* | 12/2012 | Ben-Alexander | G06Q 10/109 455/404.1 |
| 2013/0126713 A1 | 5/2013 | Haas et al. | |
| 2013/0141555 A1 | 6/2013 | Ganick et al. | |
| 2013/0183924 A1 | 7/2013 | Saigh et al. | |
| 2013/0211715 A1 | 8/2013 | Bae et al. | |
| 2013/0279917 A1 | 10/2013 | Son et al. | |
| 2013/0303192 A1 | 11/2013 | Louboutin | |
| 2013/0317835 A1 | 11/2013 | Mathew | |
| 2013/0317944 A1 | 11/2013 | Huang et al. | |
| 2013/0328917 A1 | 12/2013 | Zhou | |
| 2013/0331087 A1 | 12/2013 | Shoemaker | |
| 2013/0331118 A1 | 12/2013 | Chhabra | |
| 2013/0331137 A1 | 12/2013 | Burchill | |
| 2013/0332108 A1 | 12/2013 | Patel | |
| 2013/0332156 A1 | 12/2013 | Tackin | |
| 2013/0332208 A1 | 12/2013 | Mehta | |
| 2013/0336662 A1 | 12/2013 | Murayama et al. | |
| 2013/0343762 A1 | 12/2013 | Murayama et al. | |
| 2014/0046802 A1 | 2/2014 | Hosein et al. | |
| 2014/0055619 A1 | 2/2014 | Holland et al. | |
| 2014/0062773 A1 | 3/2014 | MacGougan | |
| 2014/0065962 A1 | 3/2014 | Le | |
| 2014/0071221 A1 | 3/2014 | Dave | |
| 2014/0072119 A1 | 3/2014 | Hranilovic et al. | |
| 2014/0105084 A1 | 4/2014 | Chhabra | |
| 2014/0132400 A1* | 5/2014 | Heaven | H04W 4/001 340/12.5 |
| 2014/0139380 A1 | 5/2014 | Ouyang | |
| 2014/0141803 A1 | 5/2014 | Marti | |
| 2014/0162628 A1 | 6/2014 | Bevelacqua | |
| 2014/0167794 A1 | 6/2014 | Nath | |
| 2014/0168170 A1 | 6/2014 | Lazarescu | |
| 2014/0171114 A1 | 6/2014 | Marti | |
| 2014/0180820 A1 | 6/2014 | Louboutin | |
| 2014/0191979 A1 | 7/2014 | Tsudik | |
| 2014/0200053 A1 | 7/2014 | Balasubramanian | |
| 2014/0222335 A1 | 8/2014 | Piemonte | |
| 2014/0232633 A1 | 8/2014 | Shultz | |
| 2014/0232634 A1 | 8/2014 | Piemonte | |
| 2014/0241730 A1 | 8/2014 | Jovicic et al. | |
| 2014/0247279 A1 | 9/2014 | Nicholas | |
| 2014/0247280 A1 | 9/2014 | Nicholas | |
| 2014/0269562 A1 | 9/2014 | Burchill | |
| 2014/0274150 A1 | 9/2014 | Marti | |
| 2014/0283135 A1 | 9/2014 | Shepherd | |
| 2014/0293959 A1 | 10/2014 | Singh | |
| 2014/0363168 A1 | 12/2014 | Walker | |
| 2014/0364089 A1 | 12/2014 | Lienhart | |
| 2014/0364148 A1 | 12/2014 | Block | |
| 2014/0365120 A1 | 12/2014 | Vulcano | |
| 2014/0375217 A1 | 12/2014 | Feri et al. | |
| 2015/0011242 A1 | 1/2015 | Nagaraj | |
| 2015/0026623 A1 | 1/2015 | Horne | |
| 2015/0031397 A1 | 1/2015 | Jouaux | |
| 2015/0038171 A1* | 2/2015 | Uilecan | G06Q 10/109 455/456.3 |
| 2015/0049190 A1 | 2/2015 | Galvez et al. | |
| 2015/0137986 A1 | 5/2015 | Kang et al. | |
| 2016/0005053 A1* | 1/2016 | Klima | G06Q 30/0201 705/7.29 |

FOREIGN PATENT DOCUMENTS

| | | |
|---|---|---|
| KR | 10-1133539000 | 4/2012 |
| WO | WO 2009/104921 | 8/2009 |

OTHER PUBLICATIONS

Bandela et al.; Praveen; "Li-Fi (Light Fidelity): The Next Generation of Wireless Network", International Journal of Advanced Trends in Computer Science and Engineering, vol. 3, No. 1, pp. 132-137 (2014).

Blau, John; "Security wins at German soccer stadium", Network World, Mar. 7, 2006.

Burchardt, Harald; "A Proposed Architecture for "Short Rolling Shutter" Messages", IEEE P802.15, Wireless Personal Area Networks, Mar. 2014.

"Challenge iBeacon Philips Smart LED communication system to locate commercial indoor lighting", by Sunricher, Feb. 18, 2014.

"Create Innovative Services with Play APPs", Date of Download: Jan. 16, 2014, http://www.oledcomm.com/LIFI.html, Oledcomm—France LiFi.

"Customer Retail Analytics", Nanuka Digital Solutions, Jun. 2, 2014.

Danakis, C et al.; "Using a CMOS Camera Sensor for Visible Light Communication"; 3rd IEEE Workshop on Optical Wireless Com- (56) References Cited

OTHER PUBLICATIONS munications; [online], Dec. 3-7, 2012 [retrieved Aug. 14, 2015]. Retrieved from the Internet: <URL: https://195.134.65.236/IEEE_Globecom_2012/papers/p1244-danakis.pdf> pp. 1244-1248.
Dawson, Keith; "LiFi in the Real World" All LED Lighting—Illuminating The Led Community, Jul. 31, 2013.
Eng, James; "Beer lines at 49ers stadium: There's an app for that", MSN News, Jul. 31, 2013.
"Get the Conversion Advantage With LightHause Visual Customer Intelligence", Visual Customer Intelligence, Sep. 16, 2012.
Gorman, Michael; "Outstanding Technology brings visible light communication to phones and tablets via dongle and LEDs", Edgadget International Editions, Jul. 16, 2012.
Haas, Harald; "Delivering safe and secure wireless communications", pureLiFi. Date of download: Jan. 16, 2014 http://purelifi.co.uk/.
Kumar, Navin; "Visible Light Communications Systems Conception and VIDAS", IETE Technical Review, vol. 25, Issue 6, Nov.-Dec. 2008. Date of download: Nov. 19, 2009. http://www.tr.ietejournals.org.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
LiFi Overview—Green wireless mobile communication—LiFi Technology. Date of download: Jan. 16, 2014.
LIGHTimes Online—LED Industry News,Jun. 17, 2014.
Montero, Eric, "Design and Implementation of Color-Shift Keying for Visible Light Communications", Sep. 2013, McMaster University.
"Nextiva Retail Traffic Analytics—Understanding Shopper Behavior to Improve Sales and the Customer Experience", Verint. Video Intelligence Solution. Aug. 2010.
Nguyen et al., "A Novel like switching scheme using pre-scanning and RSS prediction in visible light communication networks", EURASIP Journal on Wireless Communications and Networking, 2013.
Ogawa; "Article about VLC Guidance developed", Visible Light Communications Consotium (VLCC), Aug. 31, 2012.
Ogawa; "iPhone app from CASIO", Visible Light Communications Consotium (VLCC), Apr. 26, 2012.
Povey, Gordon, "VLC for Location, positioning and navigation", Jul. 27, 2011, http://visiblelightcomm.com/vlc-for-location-positioning-and-n . . . .
"Smart lights help shoppers find groceries", Lux Magazine, Feb. 19, 2014.
Thanigavel, M.; "Li-Fi Technology in Wireless Communication", International Journal of Engineering Research & Technology (IJERT), ISSN: 2278-0181, vol. 2 Issue 10, Oct. 2013.
TrueView Queue—Manual, Embedded for Axis IP cameras, version 1.0, Mar. 7, 2014.
Valinsky, Jordan; "Madison Square Garden May Add a Bathroom Wait Time App So at Least You Can Enjoy Some Sort of Victory", Betabeat, Oct. 22, 2013.
Video Analytics: Understanding Rules and Exception-based Reporting—A 3xLOGIC Discussion Guide, Intelligent Video Surveillance. Oct. 19, 2011.
Won, Eun Tae; "Visible Light Communication: Tutorial", Project: IEEE P802.15 Working Group for Wireless Personal Area Networks (WPANs), Mar. 9, 2008.
PCT Application No. PCT/US2015/033613 International Search Report and Written Opinion dated Sep. 1, 2015.
U.S. Appl. No. 14/798,210 Office Action dated Oct. 16, 2015.
U.S. Appl. No. 14/818,226 Office Action dated Sep. 28, 2015.
U.S. Appl. No. 14/798,210 Final Office Action dated Apr. 27, 2016.
U.S. Appl. No. 14/818,226 Final Office Action dated Apr. 1, 2016.
U.S. Appl. No. 14/798,210 Office Action dated Jan. 5, 2017.
U.S. Appl. No. 14/798,210 Final Office Action dated Apr. 28, 2017.
U.S. Appl. No. 14/798,210, John Cronin, Restroom Queue Management, filed Jul. 13, 2015.
U.S. Appl. No. 14/713,810, John Cronin, Concession Management, filed Jun. 5, 2015.
U.S. Appl. No. 14/732,394, John Cronin, Wireless Concession Delivery, filed Jun. 5, 2015.
U.S. Appl. No. 14/818,226, John Cronin, Wireless Communication Security System, filed Aug. 4, 2015.
U.S. Appl. No. 14/798,210 Office Action dated Oct. 4, 2017.
U.S. Appl. No. 14/732,394 Office Action dated Sep. 20, 2017.

* cited by examiner

FIG. 7

QUEUE INFORMATION TRANSMISSION

CROSS-REFERENCE TO RELATED APPLICATIONS

The present application claims the priority benefit of U.S. provisional application No. 62/029,654 filed Jul. 28, 2014 and entitled "Concession Traffic Management System Using VLC," the disclosure of which is hereby incorporated by reference.

BACKGROUND

Field of Invention

The present invention generally relates to queue management. More specifically, the present invention relates to automated queue management systems.

Description of the Related Art

Larger events, such as concerts or sporting events, are typically held in larger event venues, such as stadiums. Often, event venues may have numerous queues scattered throughout, such as queues for tickets or queues for various commercial enterprises, such as concession stands selling food. Sometimes, some of these queues can be more popular or congested than others, even if they sell the same goods or services, simply due to placement. This can lead to frustration among eventgoers due to long wait times, and frustration among vendors for low sales.

Traditionally, the field of digital communications includes wired and wireless transfer of information. Digital communications may include direct communications in which information is transmitted from a sender device to a recipient device, and may also include "indirect" communications in which information is transmitted from a sender device, through one or more "intermediary" or "middleman" devices, and eventually to a recipient device.

One example of wired transfer includes data transmitted from a sender device to a recipient device using a Universal Serial Bus (USB) cable. Another example of a wired transfer includes data transmitted within a private Local Area Network (LAN) from a sender device to a router through a sender Ethernet cable, and from the router to a recipient device through a recipient Ethernet cable.

One example of wireless transfer includes data transmitted from a sender device to a recipient device using a Bluetooth protocol connection. Another example of a wired transfer includes data transmitted within a private Wireless Local Area Network (WLAN) from a sender device to a router through a wireless Wi-Fi connection, and from the router to a recipient device through a wireless Wi-Fi connection. Another example of wireless transfer is Visible Light Communication (VLC).

Traditional wireless communications may be received and read by any recipient device within a range in which information transmitted wirelessly by a sender device can be interpreted. In some cases, information transmitted wirelessly by a sender may be within range of an unintended recipient.

Advertising a brand, a product, or a service is often an effective means for a business to obtain new customers and reinforce loyalty in existing customers. Advertising can be particularly effective if targeted at the correct audience, such as when a sport fan is told that buying a particular product will support his/her favorite team. Often, seating at sport stadiums during sporting events is divided into "sections" devoted to fans of one of the teams playing.

Advertising can be a particularly useful source of revenue during sporting events, such as football games. By using advertising, revenues may be raised, the cost of tickets may be brought down, and more fans may be allowed to go to a particular sports game.

Thus, a means of queue management including local wireless transmission of information associated with queues is needed.

SUMMARY OF THE CLAIMED INVENTION

One exemplary method for queue information transmission includes receiving queue data about a first queue. The method also includes determining a queue movement rate based on the queue data, the queue movement rate indicating a rate at which one or more people waiting in the first queue are moving forward. The method also includes determining a queue population based on the queue data, the queue population indicating how many people are waiting in the first queue. The method also includes generating a queue traffic value based on at least one of the determined queue movement rate or the determined queue population. The method also includes comparing the queue traffic value with one or more secondary queue traffic values corresponding to one or more secondary queues that are each distinct from the first queue. The method also includes generating a recommendation to wait in the first queue based on the comparison. The method also includes transmitting the recommendation wirelessly to one or more receiver devices using one or more local wireless transmitters, where each local wireless transmitter of the one or more local wireless transmitters transmits data within a wireless transmission zone near the local wireless transmitter.

One exemplary system for queue information transmission includes one or more local wireless transmitters. The system also includes a traffic management system including a memory. Execution of instructions stored in the memory by a processor of the traffic management system performs system operations. The system operations include receiving queue data about a first queue. The system operations also include determining a queue movement rate based on the queue data, the queue movement rate indicating a rate at which one or more people waiting in the first queue are moving forward. The system operations also include determining a queue population based on the queue data, the queue population indicating how many people are waiting in the first queue. The system operations also include generating a queue traffic value based on at least one of the determined queue movement rate or the determined queue population. The system operations also include comparing the queue traffic value with one or more secondary queue traffic values corresponding to one or more secondary queues that are each distinct from the first queue. The system operations also include generating a recommendation to wait in the first queue based on the comparison. The system operations also include transmitting the recommendation wirelessly to one or more receiver devices using one or more local wireless transmitters, where each local wireless transmitter of the one or more local wireless transmitters transmits data within a wireless transmission zone near the local wireless transmitter.

One exemplary non-transitory computer-readable storage medium is also described, the non-transitory computer-readable storage medium having embodied thereon a program executable by a processor to perform an exemplary program method for queue information transmission that includes receiving queue data about a first queue. The program method also includes determining a queue movement rate based on the queue data, the queue movement rate indicating a rate at which one or more people waiting in the first queue are moving forward. The program method also includes determining a queue population based on the queue data, the queue population indicating how many people are waiting in the first queue. The program method also includes generating a queue traffic value based on at least one of the determined queue movement rate or the determined queue population. The program method also includes comparing the queue traffic value with one or more secondary queue traffic values corresponding to one or more secondary queues that are each distinct from the first queue. The program method also includes generating a recommendation to wait in the first queue based on the comparison. The program method also includes transmitting the recommendation wirelessly to one or more receiver devices using one or more local wireless transmitters, where each local wireless transmitter of the one or more local wireless transmitters transmits data within a wireless transmission zone near the local wireless transmitter.

DETAILED DESCRIPTION

Information may be determined about one or more queues located within an event venue, the information including how many people are in the queue and an average rate at which the queue is moving forward. The queues may each be associated with commercial enterprises such as concession stands. If a particular queue suffers from a low queue population or a low queue movement rate, a queue broadcast may be transmitted using one or more local wireless transmitters which each have a wireless transmission zone that is at least partially within the event venue. The queue broadcast may include queue information and may include an advertisement or perk, such as a discount or special offer for the commercial enterprise associated with the queue, thus incentivizing eventgoers to go to less-crowded or less-popular queues.

Figure 1A:
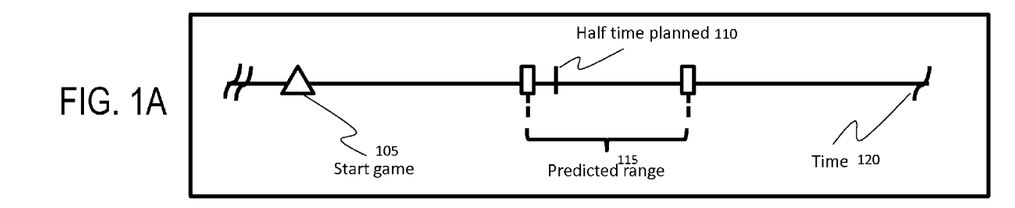
FIG. 1A illustrates an exemplary event timeline for an exemplary sporting event.

FIG. 1A illustrates an exemplary event timeline for an exemplary sporting event. For example, the event timeline of FIG. 1A includes a game start time 105. The event timeline also includes a planned half-time start point 110 at which a half-time break is planned to begin, and a predicted time range 115 that identifies a predicted range of time in which a half-time break is predicted to occur. A half-time break, or other type of event break (e.g., a lunch break) may be significant because it is a common time during which eventgoers line up at queues, for example, at bathrooms, or at event concession stands (e.g., in order to purchase food, beverages, toiletries, sporting goods, clothing, or event memorabilia). The event timeline of FIG. 1A also identifies an end time 120, which may be a planned or predicted end time for the game event, or may be a time in which certain queues are disbanded (e.g., a time in which event-based concession stands are planned to or predicted to close or otherwise cease accepting business).

Figure 1B:
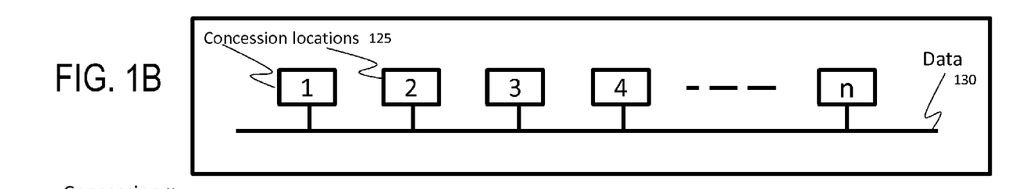
FIG. 1B illustrates an exemplary queue locations located within an exemplary event venue.

FIG. 1B illustrates an exemplary queue locations located within an exemplary event venue. In particular, FIG. 1B identifies a number of concession locations 125. Each concession location of the concession locations 125 is identified as a box with a number (e.g., 1, 2, 3, 4, ... n). There may be any number of concession locations 125. The concession locations 125 may all transmit data 130 to a concession activity software 160 and/or a traffic management system 197 as depicted in FIG. 1C.

The data 130 may be transmitted in a wired manner, such as using a Universal Serial Bus (USB) cable, a modem cable, or an Ethernet cable. The data 130 may be transmitted in a wireless manner, such as using a Bluetooth connection, a wireless Wi-Fi connection, a satellite-based communication, a radio based communication, a cellular tower based communication, or a visible light communication (VLC) system. Different concession locations 125 may transmit data 130 in different ways.

While FIG. 1B refers to concessions or concession stands, it should be understood that references to "concessions" or "concession stands" herein may refer to a variety of queue sources. For example, "concessions" may refer to localized commercial enterprises, namely locations where food, beverages, toiletries, sporting goods, clothing, or event memorabilia may be purchased (e.g., booths, stands, rooms, buildings), or may refer to restrooms, or may refer to locker rooms, or may refer to purchase return lines, or may refer to ticket lines.

Figure 1C:
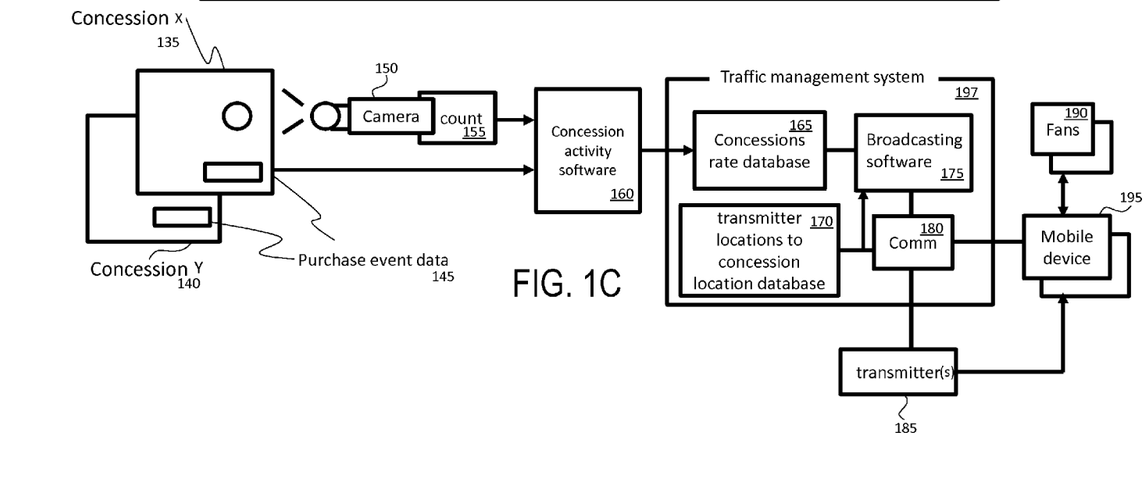
FIG. 1C is a flow diagram illustrating exemplary queue selection operations.

FIG. 1C is a flow diagram illustrating exemplary queue selection operations. In particular, the queue selection operations relate to two concession locations 123, namely a concession X 135 and a concession & 140. A queue may be associated with each concession location (e.g., queues of people lining up to order food or drinks or other purchasable or freely given goods).

A camera 150 may be used to visually view a queue, and a counting module 155 communicatively coupled to the camera 150 (e.g., receiving image and/or video data from the camera 150) may be used to count a queue population (e.g., a number of individuals standing in a queue at a particular concession location) and/or a queue length (e.g., a distance between a beginning of a queue to an end of the queue) at a given time. The counting module 155 may use any of a variety of computer vision techniques, which may include edge detection and/or counting of particular detected visible bodily features (e.g., eyes, ears, noses, mouths, heads, hands, legs, feet). A camera 150 may be included for each concession location, or in some cases, one camera 150 may be able to view multiple concession locations either simultaneously (e.g., the concession locations are close together and/or the camera 150 has a wide field of view) or in an alternating fashion (e.g., the camera 150 is motorized and periodically turns its field of view from one concession location to another). Similarly, one counting module 155 may be included for each camera 150 and/or for each concession location 125, or in other cases, one counting module 155 may be able to count queue populations or queue lengths for more than one queue and/or more than one concession location and/or more than one camera 150. In some cases, the camera counting module 155 may be centralized and/or incorporated as part of the concession activity software 160.

The queue population and/or queue length values determined by the counting module 155 in conjunction with the camera 150 may be sent to a concession activity software 160. Purchase event data 145 (e.g., identifying a number of sales/purchases/giveaways at a particular concession location and/or identifying details about the particular items sold/purchased/given) may also be sent from the concession location 125 to the concession activity software 160.

The queue population and/or queue length values, as well as the purchase event data 145, may all be entered into the concessions rate database 165 of the traffic management system 197 via the concession activity software 160.

The traffic management system 197 may also include a broadcasting software 175 that may provide queue information and/or advertisements or recommendations to eventgoers through a set of transmitters. The advertisements or recommendations may be based on data from the concessions rate database 165, and further based on data from a "transmitter locations to concession location database" 170. The transmitter locations to concession location database 170 may identify locations of various transmitters 185 (e.g., the transmitters of FIG. 2A) compared with various concession locations 125. The transmitters 185 may be used to wirelessly transmit queue information from the concessions rate database 165 and/or advertisements to mobile devices 195 (e.g., mobile device of FIG. 2B) of eventgoers 190 (e.g., sports fans if the event is a sporting event). Such advertisements or recommendations may be based on information from the concessions rate database 165 (e.g., advertising or recommending a concession location with a predicted short queue wait time when a half-time period is about to end, or advertising/recommending a particularly popular concession location) or may be based on information from the transmitter locations to concession location database 170 (e.g., advertising/recommending a concession location that is near the user mobile device that is receiving the advertisement/recommendation), or may be based on some combination thereof (e.g., advertising/recommending a concession location with a shortest queue wait time that is within an easily walkable range of near the user mobile device that is receiving the advertisement/recommendation). Transmitters may be located within the event venue, at the edges of the event venue, or outside but near the event venue (e.g., so that the transmission zone still goes into the event venue).

The traffic management system 197 may also include a communications module 180. This may be a hardware or software module (or some combination thereof) managing transmission of advertisements/recommendations and queue information by particular transmitters 185, and may, for example, include transmission drivers. The communications module 180 may in some cases by partially or fully integrated as part of the broadcasting software 175.

One or more queues is associated with each concession location (e.g., one queue for food and one queue for drinks), but for the purposes of comparison of queue rates (also referred to as "purchase rates" or "queue movement rates") or queue wait times between concession locations, the collective queues of each single concession location may be treated as a single queue (e.g., the queue rates and/or queue wait times of the queues may be averaged, or the slowest queue rate and/or longest queue wait time may be selected, or the fastest queue rate and/or shortest queue wait time may be selected). Alternately, such separate queues may be treated as separate concession locations.

Figure 2A:
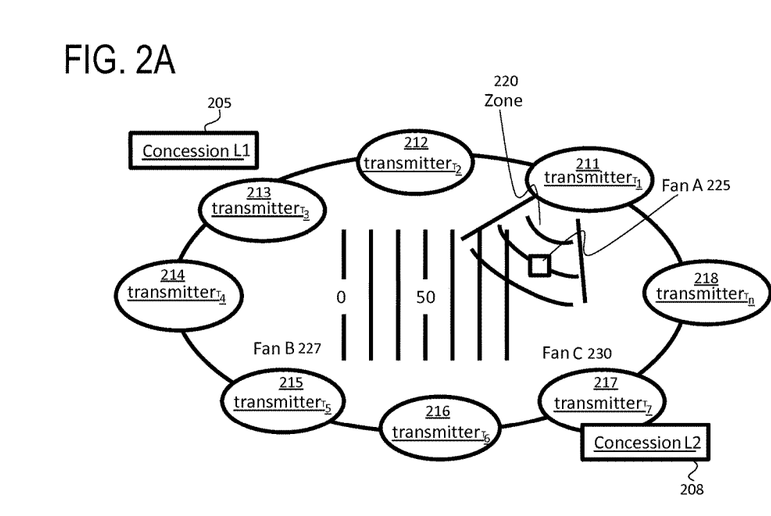
FIG. 2A illustrates an exemplary event venue ecosystem.

FIG. 2A illustrates an exemplary event venue ecosystem. The event venue is illustrated in FIG. 2A as a sport stadium, but may be any type of event venue used to host any type of event, public or private. For instance, the event venue may be a venue for any type of entertainment or cultural events that are presented at a theater, gymnasium, stadium, or other facility to a group of people. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, or the opera, and the like; religious events; and more permanent exhibitions such as a museum, historic home, and the like.

The event venue ecosystem includes two concession locations 125, identified as concession L1 205 and concession L2 208. The event venue ecosystem also includes a number of transmitters 185, identified as transmitter T1 211, transmitter T2 212, transmitter T3 213, transmitter T4 214, transmitter T5 215, transmitter T6 216, transmitter T7 217, . . . transmitter Tn 218.

Each transmitter of the transmitters 185 may be any type of information transmission system. For example, each transmitter may transmit information using a Wi-Fi connection module, a 3G/4G/LTE cellular connection module, a Bluetooth connection module, a Bluetooth low energy connection module, Bluetooth Smart connection module, a near field communication module, a radio wave communications module, a microwave communications module, a magnetic induction transmitter, a magnetic resonance transmitter, an electromagnetic radiation transmission module, a visible light communication (VLC) transmission lamp/laser/module, a laser transmission module, a speaker (e.g., audible sound transmitter, ultrasonic transmitter, infrasonic transmitter) with or without noise cancelling features, or some combination thereof. Each transmitter may include any number of sub-transmitters.

Each of the transmitters may emit a transmission through a substantially cone-shaped "transmission zone," such as the transmission zone 220 of transmitter T1 211. All (or at least a subset of) mobile devices 185 located within such as transmission zone may receive a transmission sent by the transmitter. A transmitter may have a substantially cone-shaped transmission zone (e.g., as illustrated with respect to transmission zone 220), for example, if the transmitter T1 211 is a visible light communication (VLC) transmission lamp (e.g., a fluorescent lamp or incandescent lamp or light emitting diode emitting light at least partly within the visible light spectrum), which communicates information via light. A transmitter may also have a substantially cone-shaped transmission zone if, for example, the transmitter is a speaker, such as an audible-frequency speaker, an ultrasonic-frequency speaker, an infrasonic frequency speaker, or some combination thereof.

The transmitter can alternately have a differently-shaped transmission zone, such as a transmission zone that is at least partly sphere-shaped or ovoid-shaped. For example, the transmitter could be a local Bluetooth transmitter transmitting circularly around to surrounding recipient devices.

The event venue ecosystem of FIG. 2A also illustrates three eventgoers, identified as Fan A 225, Fan B 227, and Fan C 230. Fan A 225 is illustrated as falling within the transmission zone 220 of transmitter T1 211, and therefore, a mobile device 250 belonging carried by Fan A 225 may receive a transmission (e.g., including a recommendation and/or an advertisement and/or queue information) transmitted by transmitter T1 211.

The transmitters 185 may be used inside of or otherwise associated with an event venue during an event. For example, the transmitters may be used during entertainment or cultural events that are presented at a theater, gymnasium, stadium, or other facility to a group of people. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, or the opera, and the like; religious events; and more permanent exhibitions such as a museum, historic home, and the like.

Recommendations may include textual or audio data (e.g., "concession location X has the shortest line of your nearby food concession locations") or visual data (e.g., images or video) or some combination thereof. Advertisements may include recommendations as well as additional promotional material, such as material selected or created by the commercial enterprise associated with a queue or concession location (e.g., "our burgers are the best in town"). Perks may also be sent alongside recommendations or advertisements, the perks including, for example, discounts (e.g., 50% off, 5 dollars off) or promotions (e.g., buy one get one free, free good X with purchase of good Y, free good X for being a fan of Team A, free good X for attending the event).

Figure 2B:
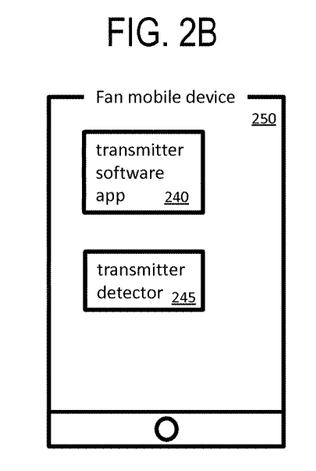
FIG. 2B illustrates an exemplary receiving mobile device.

FIG. 2B illustrates an exemplary receiving mobile device.

The mobile device 250 of FIG. 2B may be associated with one of the eventgoers (e.g., Fan A 225, Fan B 227, Fan C 230) of the ecosystem of FIG. 2A, or may be a mobile device 250 of a different ecosystem. The mobile device 250 may be any type of computing device, such as the computing device 700 of FIG. 7. The mobile device 250 may be, for example, a smartphone, a tablet device, a wearable device (e.g., a smart watch, a smart bracelet/jewelry, or smart glasses), a laptop computer, a portable video game console, a portable e-reader device, or a portable media player device.

The mobile device 250 may include a transmission detector 245. The transmission detector 245 may include, for example, the ability to receive information using a Wi-Fi connection module, a 3G/4G/LTE cellular connection module, a Bluetooth connection module, a Bluetooth low energy connection module, Bluetooth Smart connection module, a near field communication module, a radio wave communications module, a microwave communications module, a magnetic induction receiver, a magnetic resonance receiver, an electromagnetic radiation receiver module, a visible light communication (VLC) receiver module, a laser transmission receiver module, a microphone (e.g., audible sound receiver, ultrasonic receiver, infrasonic receiver) with or without noise cancelling features, or some combination thereof. The transmission detector 245 may include any number of sub-receivers.

Figure 7:
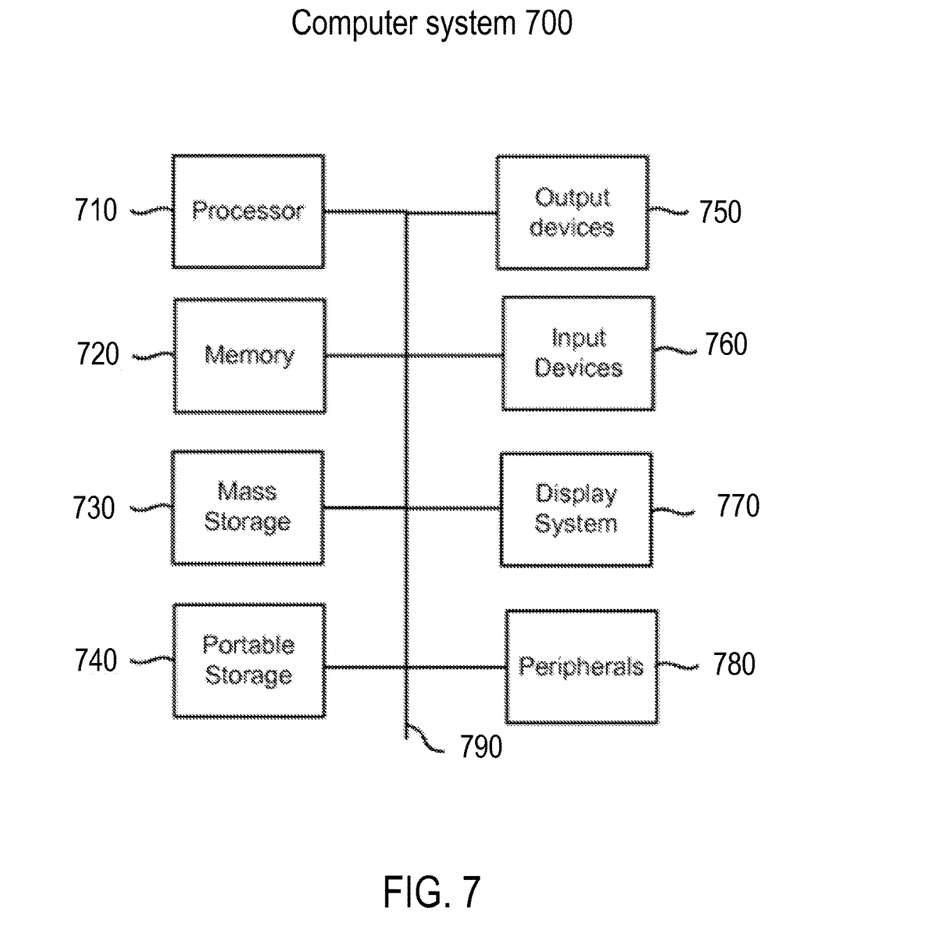
FIG. 7 is a block diagram of an exemplary computing device that may be used to implement an embodiment of the present invention.

The recipient device may also include a display (not shown), which may be any type of display system 770 described in FIG. 7.

The recipient device may also include a transmitter software app 240 through which the information transmitted from the transmitters 185 (e.g. recommendations and/or advertisements and/or queue information) may be displayed by the mobile device 250. The transmitter software app 240 may be an operating system, or it may alternately be a more specialized software application, such as a social media platform software application, a news reader application, a feed reader application, an email reader application, or a message reader application.

Figure 2C:
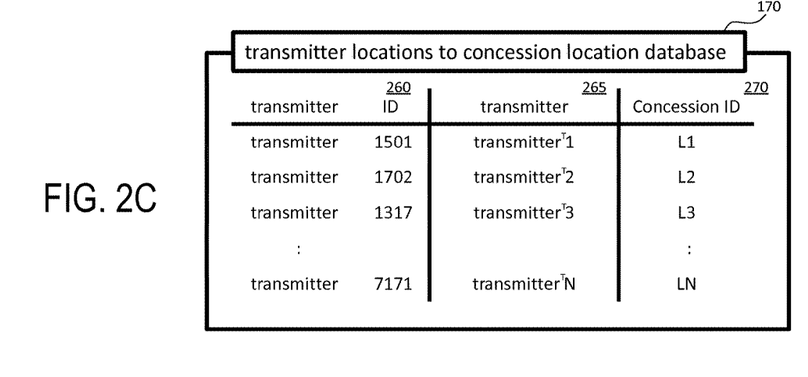
FIG. 2C illustrates an exemplary transmitter locations to concession location database.

FIG. 2C illustrates an exemplary transmitter locations to concession location database. The transmitter locations to concession location database 170 of FIG. 2C is illustrated with three columns of information. The database 170 includes a transmitter column 265, which identifies a transmitter of the transmitters 185 illustrated in FIG. 2A. The database 170 includes a transmitter ID column 260, which further includes an identifier for each of the transmitters 185 (e.g., a serial number, a barcode, a name, a directional identifier, or some other identifier useful for accessing the transmitter). The database 170 also includes a concession ID column 270, which identifies concession locations that are near each transmitter. While only one concession location is listed in FIG. 2C as "corresponding with" each transmitter (e.g., within or near the transmitter's transmission zone), in other cases a number of concession locations may correspond with each transmitter (e.g., some transmission zones may include a number of concession stands, such as transmitter zones located over a "food court" area of an event venue).

Figure 3A:
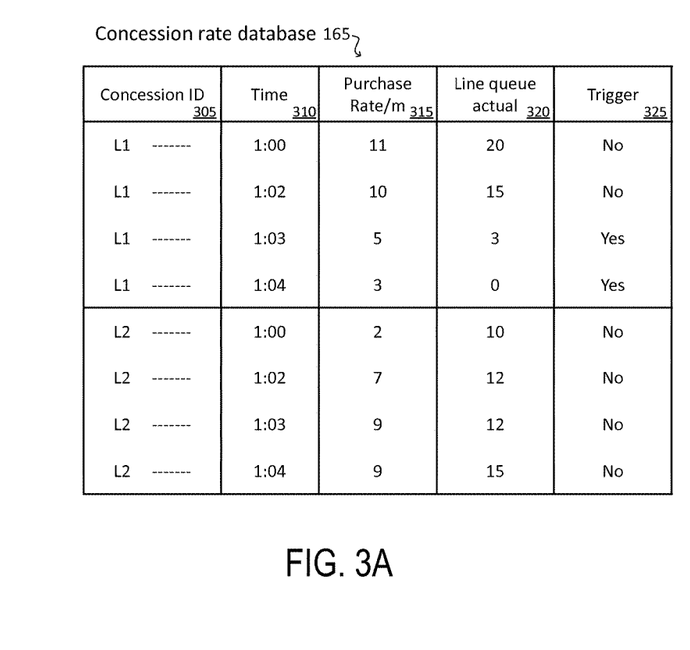
FIG. 3A illustrates an exemplary concession rate database.

FIG. 3A illustrates an exemplary concession rate database. The concession rate database 165 illustrated in FIG. 3A includes five columns of information. In particular, the concession rate database 165 illustrated in FIG. 3A includes a concession ID column 305 that identifies a particular concession location. Next, the concession rate database 165 includes a time column 310 that identifies a particular time (e.g., a time of day during an event at the event venue).

Next, the concession rate database 165 includes a purchase rate column 315 that identifies a rate of purchases (or giveaways in a situation where the concession is giving something away for free), at, for example, a rate of purchases (or giveaways) per minute, at the time identified in column 310 and at the concession location identified in column 305.

Next, the concession rate database 165 includes a line queue actual column 320 identifying a number of people in the queue at the time identified in column 310 and at the concession location identified in column 305.

Next, the concession rate database 165 includes a trigger column 325 identifying whether a "trigger" is activated or not. A "trigger," if activated, indicates that an advertisement/recommendation is to be sent (or has been sent) to one or more eventgoers (e.g., via a transmitter sending an advertisement to a mobile device 250 associated with each eventgoer of the one or more eventgoers) to encourage the eventgoers to visit the concession location identified in column 305. The trigger may indicate that the advertisement/recommendation should be sent out through all transmitters 185 (e.g., to all transmission zones in the event venue) or through a subset of the transmitters 185 (e.g., through one or more transmission zones nearest to the concession location or furthest from the concession location). In FIG. 3A, the trigger is activated for concession location L1 at times 1:03 and 1:04, when concession location L1 has only three and zero people queued, respectively. An example advertisement or recommendation could encourage nearby eventgoers to go to concession location L1, and could include incentives, such as discounts (e.g., a predetermined value or percentage discount) or special offers (e.g., a "buy one get one free" offer).

Figure 3B:
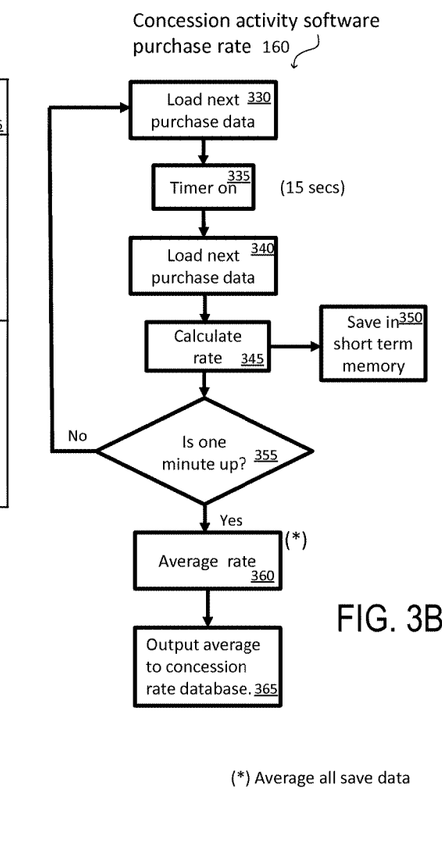
FIG. 3B is a flow diagram illustrating exemplary purchase rate calculation operations.

FIG. 3B is a flow diagram illustrating exemplary purchase rate calculation operations. The purchase rate (or "queue rate") calculation operations of FIG. 3B may be performed by the concession activity software 160, for example.

The purchase rate calculation operations of FIG. 3B may begin with loading (or receiving) purchase data in step 330, the purchase data indicating that a purchase was made at a particular queue. In step 335, a timer is started. In step 340, purchase data is received indicating that another purchase was made at the same queue, at which point the timer of step 330 may be stopped, so that the time recorded by the timer shows how much time elapsed between purchases within the queue. For example, the timer may indicate that 15 seconds lapsed between the two purchases. At step 345, a purchase rate may be calculated based on the timer. For example, dividing the 60 seconds of a minute by the example 15 second time between purchases would indicate a purchase rate of 4 purchases per minute. At step 350, the purchase rate may then be stored into a short term memory, which may be a memory 720 or mass storage 730 or portable storage 740.

At step 355, a second timer may be checked that has been measuring time since the first purchase data was received at step 330 indicating the first purchase was completed at the queue. If this second timer does not indicate that a minute has passed, the purchase rate calculation operations of FIG. 3B may loop back to step 330 in order to record more purchases.

If, at step 355, the second timer indicates that a minute has passed, the timer values (e.g., storing purchase rates calculated based on times between every two purchases) stored in short term memory at step 350 may be averaged at step 360 to obtain an average purchase rate per minute. This average purchase rate per minute may then, at step 365, be output into the concession rate database 165 (e.g., see purchase rate column 315 of the concession rate database 165 of FIG. 3A).

Figure 4A:
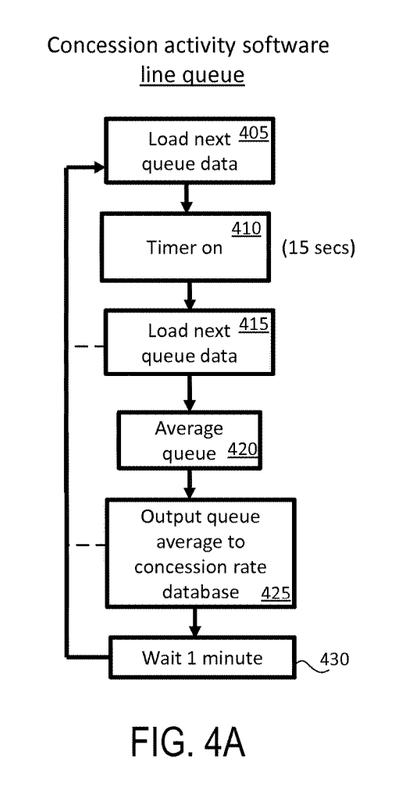
FIG. 4A is a flow diagram illustrating exemplary average queue length or queue population calculation operations.

FIG. 4A is a flow diagram illustrating exemplary average queue length or queue population calculation operations. The queue length and queue population average calculation operations may also calculate queue rate (or "purchase rate") using an alternate method than depicted in FIG. 3B.

In particular, the exemplary average queue length and queue population calculation operations may begin at step 405 with receiving a queue count from a counting module 155 coupled to a camera 150. At step 410, a timer may be started. The next time a different queue count is received from the counting module 155 at step 415 (e.g., one less person is in line because a purchase has been made), the timer may be stopped and the time recorded (e.g., in short term memory as in step 350 of FIG. 3B). In some cases, the average queue population (or queue length) calculation operations may then return to step 405 (e.g., if a minute has not been reached as in step 355 of FIG. 3B), but other wise, at step 420, the queue length over a particular amount of time (e.g., the past minute) may be averaged in order to obtain an average queue length during the past minute. At step 425, this average queue population (or queue length) may be output into the concession rate database 165 (e.g., see line queue actual column 320 of the concession rate database 165 of FIG. 3A). In some cases, the queue rate (or "purchase rate") may be calculated using the timer of 410, averaged at step 420, and also output at step 425 (e.g., see purchase rate column 315 of the concession rate database 165 of FIG. 3A). In some cases, the exemplary average queue length calculation operations may include waiting for a minute at step 430, for example to save power or to allow the camera 150 to look at one queue for a minute and then another queue for the next minute (e.g., if the camera 150 moves). Step 430 may also refer to waiting until a minute passes from step 450 so that the next average queue population (or queue length)

Figure 4B:
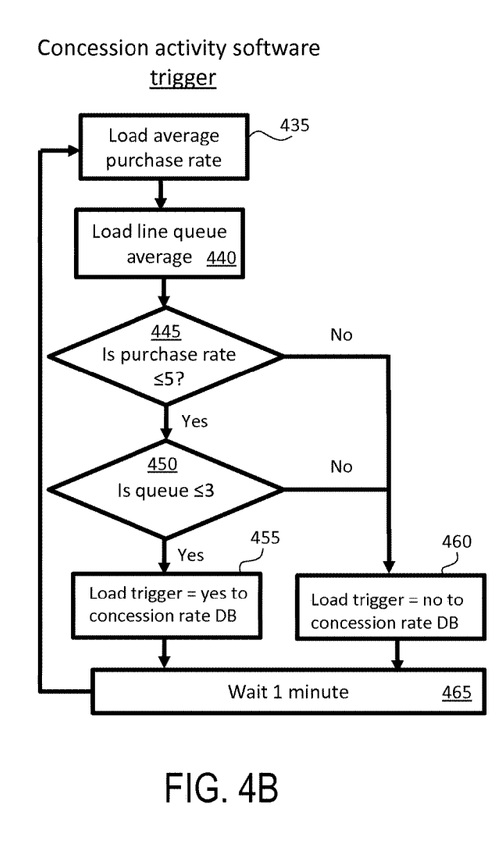
FIG. 4B is a flow diagram illustrating exemplary advertisement or recommendation trigger operations.

FIG. 4B is a flow diagram illustrating exemplary advertisement or recommendation trigger operations. In particular, the advertisement or recommendation trigger operations may start at step 435 by loading an average purchase rate from the concession rate database 165 (e.g., see purchase rate column 315 of the concession rate database 165 of FIG. 3A), and at step 440 by loading an average queue population (or queue length) from the concession rate database 165 (e.g., see line queue actual column 320 of the concession rate database 165 of FIG. 3A).

Once the average purchase rate is loaded at step 435, it may be compared at step 445 to a predetermined lower bound limit (e.g., 5 purchases per minute). If the average purchase rate is not below the lower bound limit, the advertisement or recommendation is not triggered by the purchase rate, but if it is below the lower bound limit, then an advertisement or recommendation may be triggered (which may be marked in the concession rate database 165 of FIG. 3A with a "yes" under the "trigger" column 325).

Once the average queue population (or queue length) is loaded at step 440, it may be compared at step 445 to a predetermined lower bound limit (e.g., a queue population of three people, or three meters). If the queue population (or queue length) is not below the lower bound limit, the advertisement or recommendation is not triggered by the purchase rate, but if it is below the lower bound limit, then an advertisement or recommendation may be triggered (which may be marked in the concession rate database 165 of FIG. 3A with a "yes" under the "trigger" column 325).

Ultimately, then, if the average purchase rate is lower than or equal to the lower bound limit of step 445, or if the average queue population (or queue length) is lower than or equal to the lower bound limit of step 450, the concession rate database 165 may identify this (e.g., a "yes" may be marked under the "trigger" column 325 in the concession rate database 165 of FIG. 3A). In contrast, if the average purchase rate is higher than the lower bound limit of step 445, and if the average queue population (or queue length) is higher than the lower bound limit of step 450, the concession rate database 165 may identify this (e.g., a "no" may be marked under the "trigger" column 325 in the concession rate database 165 of FIG. 3A).

The advertisement trigger operations may then, at step 465, wait until a minute has passed from step 435 to repeat the advertisement trigger operations for the next time slot (e.g., the next minute of the event).

Figure 5:
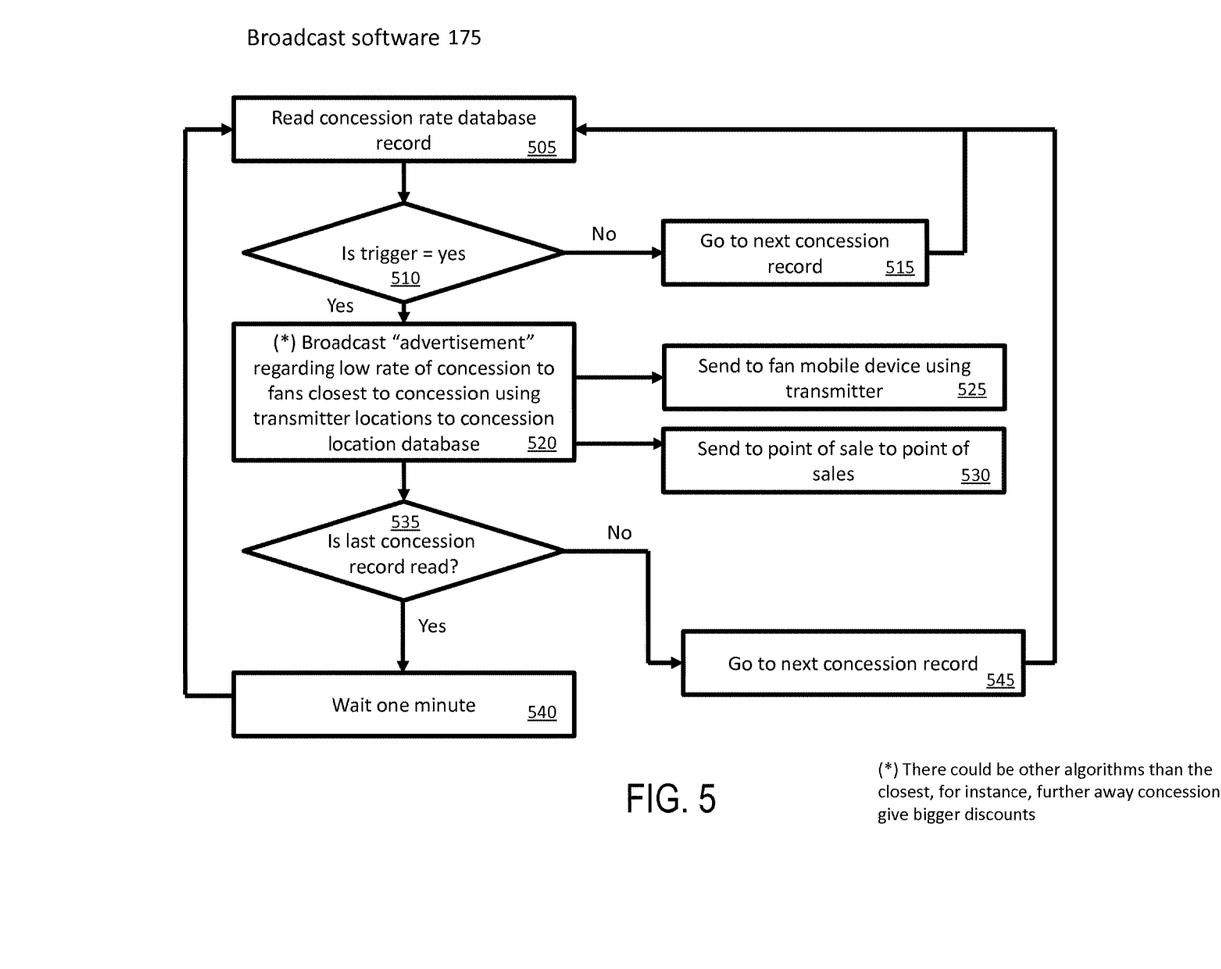
FIG. 5 is a flow diagram illustrating exemplary advertisement or recommendation transmitting operations.

FIG. 5 is a flow diagram illustrating exemplary advertisement or recommendation transmitting operations. The advertisement or recommendation transmitting operations of FIG. 5 may be performed by the broadcasting software 175.

At step 505, a record identifying a particular time and a particular concession location may be read from the concession rate database 165. At step 510, the concession rate database 165 is checked to determine if an advertisement or recommendation is to be triggered (e.g., using the "trigger" column 325 of the concession rate database 165 of FIG. 3A). If no advertisement or recommendation is to be triggered, the next record of the concession rate database 165 is loaded (e.g., describing a different time and/or concession location) at step 515, after which the advertisement or recommendation transmitting operations begin anew at step 505.

If an advertisement is to be triggered at 515, it may be broadcast at step 520 through one or more transmitters. As described in step 525, the broadcasting of the advertisement or recommendation may be performed via one or more of the transmitters to eventgoer mobile devices 250. Different selections of transmitters may be used—for example, an advertisement or recommendation may be transmitted to transmitters with transmission zones nearest to a particular concession location. Alternately, all or most of the transmitters in the event venue may transmit an advertisement or recommendation for the same concession location, though the content of the advertisement or recommendation may vary (e.g., eventgoers who are farther from the concession location may receive higher discounts in their advertisements or recommendations than eventgoers who are closer to the concession location). The point of sale of the concession location may also be notified in step 530 that the advertisement or recommendation has been sent, so that the concession location knows to honor advertisement or recommendation perks/discounts/promotions, knows to expect more customers (e.g., and longer queues), and may be required to pay a managing entity (e.g., a managing entity of the event venue, of the traffic management system 197, or of one or more of the transmitters 185). It should be noted that while step 520 describes the sending of advertisements or recommendations, simple queue information may also be sent out, the queue information including, for example, queue population, queue length, purchase rate (also referred to as "queue rate"), a predicted wait time (e.g., 60 seconds multiplied by queue population divided by purchase rate in purchases per minute).

Once the advertisement or recommendation has been sent out, the advertisement or recommendation transmitting operations may check to determine if the record of step 505 was the last concession record stored in the concession rate database 165.

If it was not the last record, the next record of the concession rate database 165 is loaded (e.g., describing a different time and/or concession location) at step 545, after which the advertisement or recommendation transmitting operations begin anew at step 505. If it was the last record, the advertisement or recommendation transmitting operations may then, at step 540, wait until a minute has passed (e.g., so that new records appear in the concession rate database 165 pertaining to the new minute) to repeat the advertisement or recommendation transmitting operations for the next time slot (e.g., the next minute of the event).

Figure 6:
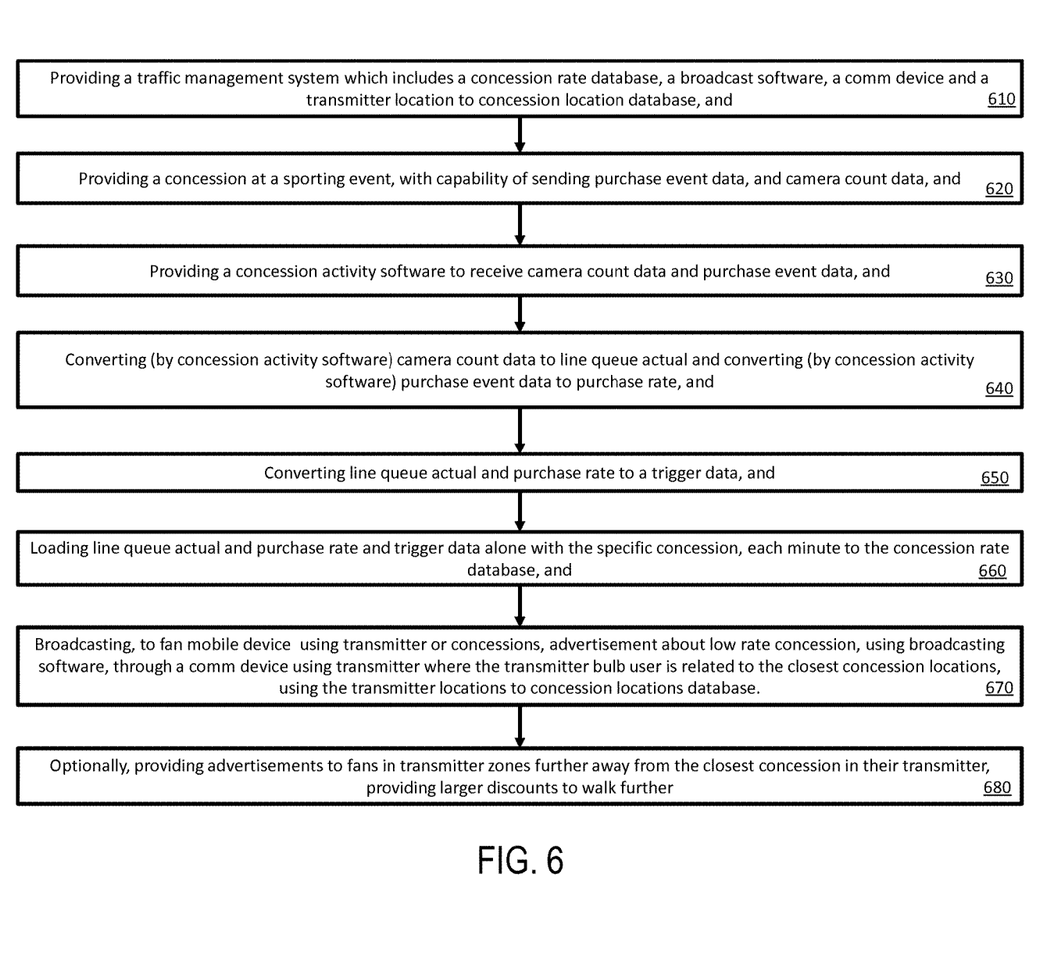
FIG. 6 illustrates an exemplary overall method of the present invention as described herein.

FIG. 6 illustrates an exemplary overall method of the present invention as described herein.

In step 610, the method includes providing a traffic management system 197, which includes a concession rate database 165, a broadcast software 175, a comm device 180 and a transmitter location to concession location database 170.

In step 620, the method includes providing a concession (e.g. concession location X 135 or concession location Y 140) at a sporting (or other) event, with capability of sending purchase event data 145, and camera count data from a camera 150 and camera counting module 155.

In step 630, the method includes providing a concession activity software 160 to receive camera count data and purchase event data 145, and In step 640, the method includes converting (by concession activity software 160) camera count data to line queue actual (e.g., see FIG. 4A) and converting (by concession activity software) purchase event data to purchase rate (e.g., see FIG. 3B).

In step 650, the method includes converting line queue actual and purchase rate to a trigger data (e.g., see FIG. 4B).

In step 660, the method includes loading line queue actual and purchase rate and trigger data alone with the specific concession, each minute to the concession rate database (e.g., see FIG. 5 step 505).

In step 670, the method includes broadcasting, to fan mobile device 250 using transmitter 185 or concession locations 125, advertisement or recommendation about low purchase rate concession locations, using broadcasting software 175, through a comm device 180 using one or more transmitters 185 where the transmitter user is related to the closest concession locations, using the transmitter locations to concession locations database 170 (e.g., see FIG. 5 step 520).

In step 680, the method optionally includes providing advertisements or recommendations to fans in transmitter zones further away from the closest concession in their transmitter, providing larger discounts to walk further.

FIG. 7 illustrates an exemplary computing system 700 that may be used to implement an embodiment of the present invention. The computing system 700 of FIG. 7 includes one or more processors 710 and memory 710. Main memory 710 stores, in part, instructions and data for execution by processor 710. Main memory 710 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 710 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 710.

Portable storage device 740 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750.

Examples of suitable output devices include speakers, printers, network interfaces, and monitors.

Display system 770 may include a liquid crystal display (LCD) or other suitable display device. Display system 770 receives textual and graphical information, and processes the information for output to the display device.

Peripherals 780 may include any type of computer support device to add additional functionality to the computer system. For example, peripheral device(s) 780 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for queue management, the method comprising:
   executing instructions stored in memory by a processor, wherein execution of the instructions by the processor causes the processor to:
   receive a location of a receiver device,
   receive a camera feed from a camera, the camera feed depicting a first queue that is within a predetermined range of the location of the receiver device,
   receive a first purchase dataset from a first concession device corresponding to the first queue, the first purchase dataset identifying purchases made using the first concession device,
   generate a first queue population value based on a plurality of edges detected within the camera feed, wherein at least a subset of the plurality of edges represent people waiting in the first queue, the first queue population value identifying a number of people waiting in the first queue,
   calculate a first queue movement rate based on the camera feed, wherein the first queue movement rate indicates a rate at which a person waiting in the first queue moves toward a front of the first queue,
   evaluate wait times for the first queue and for a second queue based on the first queue population value, the first queue movement rate, the first purchase dataset, a second queue population value, a second queue movement rate, and a second purchase dataset, wherein the second queue population value and the second queue movement rate describe the second queue, and wherein the second purchase dataset describes a second concession device corresponding to the second queue, wherein the second queue is also within the predetermined range of the location of the receiver device,
   generate a recommendation to wait in the first queue rather than the second queue based on the evaluating of the wait times,
   select a first wireless transmitter of a plurality of wireless transmitters based on the location of the receiver device, wherein the location of the receiver device is within a wireless transmission zone of the first wireless transmitter, and
   transmit the recommendation and associated advertisement content wirelessly to the receiver device via the first wireless transmitter.

2. The method of claim 1, further comprising transmitting at least one of the first queue movement rate or the first queue population value to the receiver device via the first wireless transmitter.

3. The method of claim 1, further comprising transmitting the recommendation and associated advertisement content to the receiver device via a second wireless transmitter as well as the first wireless transmitter.

4. The method of claim 1, further comprising transmitting a perk for a commercial enterprise associated with the first queue and the first concession device to the receiver device via the first wireless transmitter, the perk being at least one of a discount or a special offer.

5. The method of claim 1, further comprising receiving a second camera feed from a second camera, the second camera feed depicting the second queue, and wherein execution of the instructions by the processor further causes the processor to:
   generate the second queue population value based on a second plurality of edges detected within the second camera feed, wherein at least a subset of the second plurality of edges represent people waiting in the second queue, the second queue population value identifying a number of people waiting in the second queue, and
   calculate the second queue movement rate based on the second camera feed, wherein the second queue movement rate indicates a rate at which a person waiting in the second queue moves toward a front of the second queue.

6. The method of claim 1, wherein the wireless transmission zone includes at least a portion of an eventgoer area of an event venue.

7. The method of claim 1, wherein the plurality of wireless transmitters includes at least one non-selected local wireless transmitter that is distinct from the first wireless transmitter.

8. The method of claim 6, wherein selecting the first wireless transmitter of the plurality of wireless transmitters is also based a distance between the wireless transmission zone and the first queue.

9. The method of claim 1, wherein execution of the instructions by the processor causes the processor to identify at least one of a queue movement rate deficiency or a queue population deficiency, the queue movement rate deficiency indicating that the first queue movement rate falls below a predetermined lower bound queue movement rate, the queue population deficiency indicating that the first queue population value falls below a predetermined lower bound queue population value.

10. The method of claim 1, wherein execution of the instructions by the processor causes the processor to calculate a purchase rate based on the first purchase dataset.

11. The method of claim 10, further comprising notifying a managing device of a cost associated with transmitting the recommendation and associated advertisement content wirelessly to the receiver device via the first wireless transmitter.

12. The method of claim 1, wherein the first purchase dataset is a purchase log associated with the first queue and the first concession device, and wherein further execution of the instructions by the processor causes the processor to calculate an average time between purchases in the purchase log.

13. The method of claim 1, wherein the first wireless transmitter transmits the recommendation and the associated advertisement content via one or more wireless transmissions that include at least one of a Bluetooth data transmission, a Wi-Fi data transmission, a cellular data transmission, a radio wave data transmission, a microwave data transmission, a magnetic induction data transmission a magnetic resonance data transmission, an electromagnetic radiation data transmission, a visible light communication data transmission, an ultrasonic audio data transmission, an sonic audio data transmission, or an infrasonic audio data transmission.

14. The method of claim 4, wherein execution of the instructions by the processor causes the processor to select the perk based on a distance between the first queue and the location of the receiver device.

15. A system for queue management, the system comprising:
   a communication receiver, wherein the communication receiver:
      receives a location of a receiver device, and
      receives a camera feed from a camera, the camera feed depicting a first queue that is within a predetermined range of the location of the receiver device;
   a plurality of wireless transmitters; and
   a traffic management system including a memory and a processor, wherein execution of instructions stored in the memory by the processor causes the processor to:
      generate a first queue population value based on a plurality of edges detected within the camera feed, wherein at least a subset of the plurality of edges represent people waiting in the first queue, the first queue population value identifying a number of people waiting in the first queue,
      calculate a first queue movement rate based on the camera feed, wherein the first queue movement rate indicates a rate at which a person waiting in the first queue moves toward a front of the first queue,
      evaluate wait times for the first queue and a second queue based on the first queue population value, the first queue movement rate, a first purchase dataset, a second queue population value, a second queue movement rate, and a second purchase dataset, wherein the second queue population value and the second queue movement rate describe the second queue, wherein the first purchase dataset describes a first concession device corresponding to the first queue, wherein the second purchase dataset describes a second concession device corresponding to the second queue, wherein the second queue is also within the predetermined range of the location of the receiver device,
      generate a recommendation to wait in the first queue rather than the second queue based on the evaluating of the wait times,
      select a first wireless transmitter of the plurality of wireless transmitters based on the location of the receiver device, wherein the location of the receiver device is within a wireless transmission zone of the first wireless transmitter, and
      transmit the recommendation and associated advertisement content via the first wireless transmitter.

16. The system of claim 15, further comprising a queue database stored in the memory, wherein execution of the instructions by the processor causes the processor to:
   store the first queue population value and the first queue movement value in the queue database, and
   retrieve the second queue population value and the second queue movement value from the queue database.

17. The system of claim 15, further comprising a concessions database stored in the memory, wherein execution of the instructions by the processor causes the processor to store the first purchase dataset in the concession database.

18. The system of claim 15, wherein the first wireless transmitter transmits the recommendation and the associated advertisement content via one or more wireless transmissions that include at least one of a Bluetooth data transmission, a Wi-Fi data transmission, a cellular data transmission, a radio wave data transmission, a microwave data transmission, a magnetic induction data transmission a magnetic resonance data transmission, an electromagnetic radiation data transmission, a visible light communication data transmission, an ultrasonic audio data transmission, an sonic audio data transmission, or an infrasonic audio data transmission.

19. A non-transitory computer-readable storage medium, having embodied thereon a program executable by a processor to perform a method for queue information transmission, the method comprising:
   receiving a location of a receiver device;
   receiving a camera feed from a camera, the camera feed depicting a first queue that is within a predetermined range of the location of the receiver device;
   receiving a first purchase dataset from a first concession device corresponding to the first queue, the purchase dataset identifying at least one purchase made using the first concession device;
   generating a first queue population value based on a plurality of edges detected within the camera feed, wherein at least a subset of the plurality of edges represent people waiting in the first queue, the first queue population value identifying a number of people waiting in the first queue;
   calculating a first queue movement rate based on the camera feed, wherein the first queue movement rate indicates a rate at which a person waiting in the first queue moves toward a front of the first queue;
   evaluating wait times for the first queue with and a second queue based on the first queue population value, the first queue movement rate, the first purchase dataset, a second queue population value, a second queue movement rate, and a second purchase dataset, wherein the second queue population value and the second queue movement rate describe the second queue, and wherein the second purchase dataset describes a second concession device corresponding to the second queue, wherein the second queue is also within the predetermined range of the location of the receiver device;

generating a recommendation to wait in the first queue rather than the second queue based on the evaluating of the wait times;

selecting a first wireless transmitter of a plurality of wireless transmitters based on the location of the receiver device, wherein the location of the receiver device is within a wireless transmission zone of the first wireless transmitter; and transmitting the recommendation and associated advertisement content wirelessly to the receiver device via the first wireless transmitter.

\* \* \* \* \*